US012571528B2

(12) United States Patent
McDonald

(10) Patent No.: US 12,571,528 B2
(45) Date of Patent: Mar. 10, 2026

(54) SWITCHABLE LIGHT BULB ASSEMBLY

(71) Applicant: John McDonald, Cortland, OH (US)

(72) Inventor: John McDonald, Cortland, OH (US)

( * ) Notice: Subject to any disclaimer, the term of this patent is extended or adjusted under 35 U.S.C. 154(b) by 0 days.

(21) Appl. No.: 19/037,600

(22) Filed: Jan. 27, 2025

(65) Prior Publication Data

US 2025/0244001 A1 Jul. 31, 2025

Related U.S. Application Data

(60) Provisional application No. 63/626,262, filed on Jan. 29, 2024.

(51) Int. Cl.

| | |
|---|---|
| ***F21V 23/04*** | (2006.01) |
| ***F21V 23/00*** | (2015.01) |
| ***F21V 23/06*** | (2006.01) |
| ***H05B 45/10*** | (2020.01) |
| *F21Y 115/10* | (2016.01) |

(52) U.S. Cl.
CPC ............ *F21V 23/04* (2013.01); *F21V 23/002* (2013.01); *F21V 23/009* (2013.01); *F21V 23/06* (2013.01); *H05B 45/10* (2020.01); *F21Y 2115/10* (2016.08)

(58) Field of Classification Search
CPC ...... F21V 23/04; F21V 23/002; F21V 23/009; F21V 23/06; H05B 45/10
See application file for complete search history.

(56) References Cited

U.S. PATENT DOCUMENTS

| | | | | |
|---|---|---|---|---|
| 11,512,839 | B1 * | 11/2022 | Delalande | F21V 29/70 |
| 2021/0018147 | A1 * | 1/2021 | Liu | F21K 9/237 |
| 2021/0404618 | A1 * | 12/2021 | Li | H01H 36/00 |
| 2022/0042658 | A1 * | 2/2022 | Chen | F21K 9/238 |
| 2022/0120387 | A1 * | 4/2022 | Yan | H05B 45/10 |
| 2024/0077190 | A1 * | 3/2024 | Wu | F21V 19/0045 |
| 2025/0093020 | A1 * | 3/2025 | Xiao | F21V 23/001 |

* cited by examiner

*Primary Examiner* — Christopher E Dunay
(74) *Attorney, Agent, or Firm* — Harpman & Harpman

(57) ABSTRACT

An LED light source adapted to use in an electrical socket that provides switchable selectability in LED drives for light output values dependent on selected positions to predetermined control values. A rotatable switching element integrated into the base of the LED bulb for switchable positioning by the user.

4 Claims, 7 Drawing Sheets

SWITCHABLE LIGHT BULB ASSEMBLY

This application claims the benefit of U.S. Provisional Application No. 63/626,262, filed Jan. 29, 2024.

BACKGROUND OF THE INVENTION

1. Technical Field

This invention is directed to LED light sources using light emitting diodes to provide variable viable light source.

2. Description of Prior Art

Prior art LED based light bulbs have been developed with a variety of different control activation configurations, see for example U.S. Pat. No. 8,794,791 on a light emitting diode board light having an elevated and reflected surface between the upper and lower substrates.

U.S. Publication 2011/0006679 discloses an LED light bulb with an irradiation range by arranged LED elements in three-dimension.

U.S. Pat. No. 9,310,061 claims a light bulb assembly with a base having integral terminals for connectivity.

U.S. Patent Publication 2018/0100642 is directed to a directional light output LED bulb having a base portion and a rotating light transmitting bulb portion.

SUMMARY OF THE INVENTION

A switchable LED light bulb configuration having a multiple switch position base with a rotatable switch element that selectively contacts different LED activation settings to provide a selectable light output. Manual selectable rotation of a bulb base portion in the bulb base allows the user to determine light output based on the predetermined selected values.

DETAILED DESCRIPTION OF THE INVENTION

Figure 1:
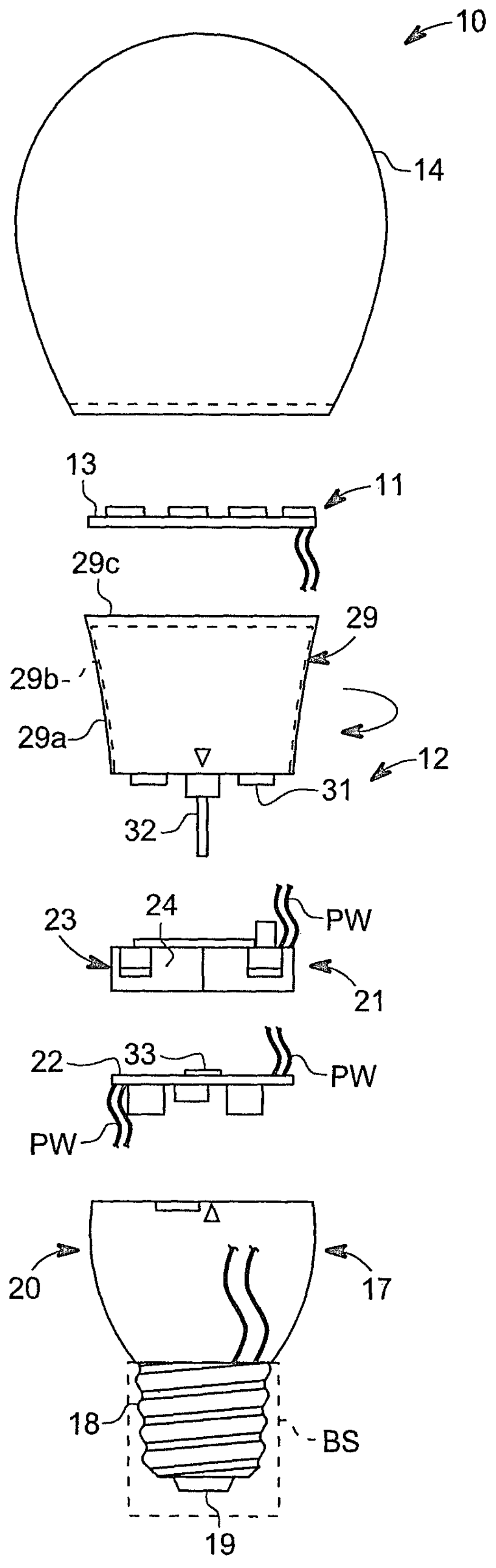
FIG. 1 is an exploded front elevational view of the switchable lightbulb of the invention.

Referring to FIG. 1 of the drawings, a switchable dimmable light bulb 10 of the invention can be seen having an LED bulb portion 11 and a switch portion 12. The LED bulb portion 11 has an LED driver chip RGB assembly 13 positioned within a plastic light diffusing globe 14 as is well known within the art. A globe base 15 is provided as a mounting surface and enclosure and support surface for the LED chip assembly 13 drivers and the light diffusing globe 14 associated therewith.

Figure 4:
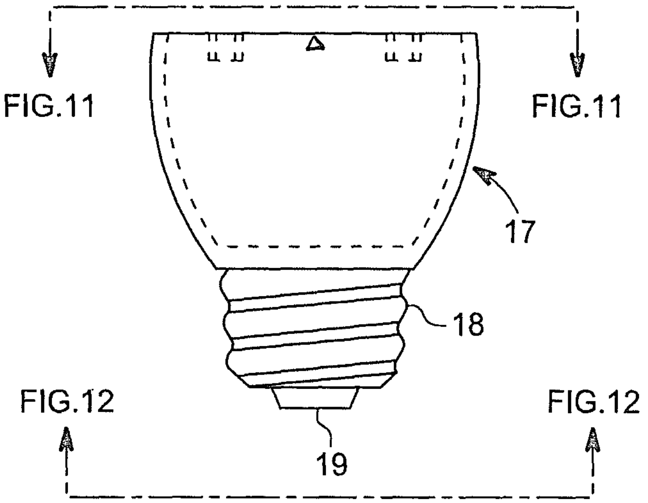
FIG. 4 is an enlarged front elevational view of the support base assembly.
Figure 5:
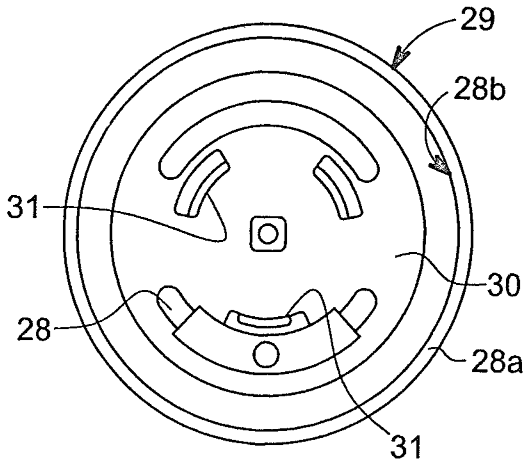
FIG. 5 is a top plan view of lines 5-5 of FIG. 2 of the drawings.
Figure 6:
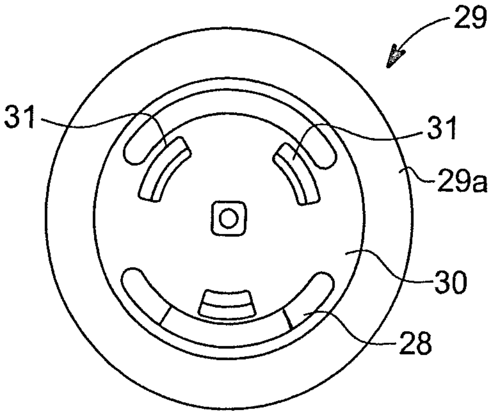
FIG. 6 is a bottom plan view on lines 6-6 of FIG. 2 of the drawings.
Figure 7:
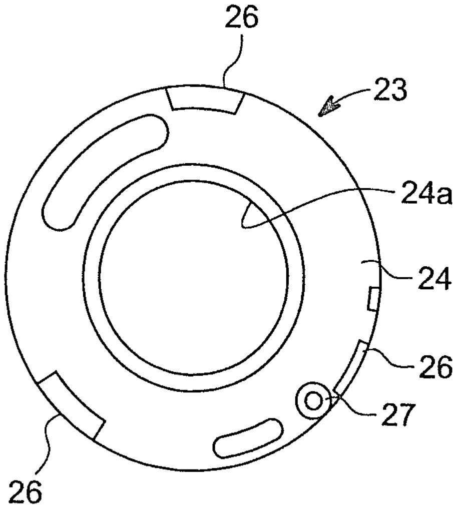
FIG. 7 is a top plan view on lines 7-7 of FIG. 3 of the drawings.
Figure 8:
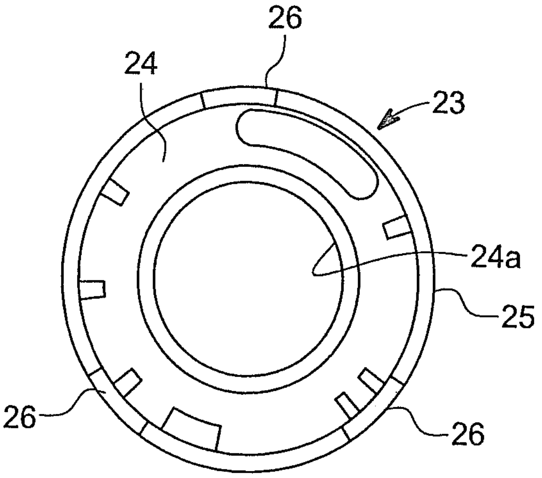
FIG. 8 is a bottom plan view on lines 8-8 of FIG. 3 of the drawings.
Figure 9:
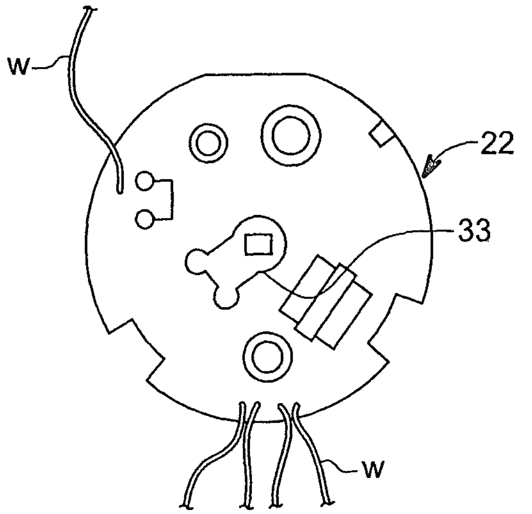
FIG. 9 is an enlarged bottom plan view of a control circuit board of the invention.

The switch portion 12 comprises a support assembly 17 having a threaded metal socket engagement 18 with a positive center power contact 19 in a non-conductive plastic housing 20 as is well known within the art. Referring now to FIGS. 2-5 of the drawings, a rotary switch assembly 21 can be seen having a circuit board 22 within a mounting ring fixture 23 as seen in FIGS. 4 and 5 of the drawings. The mounting ring fixture 23 has a base 24 with a central opening at 24A and a depending perimeter annular sidewall 25. Multiple resilient perimeter retainment clips 26 are formed therein for registration with the bulb base support assembly 17.

Figure 2:
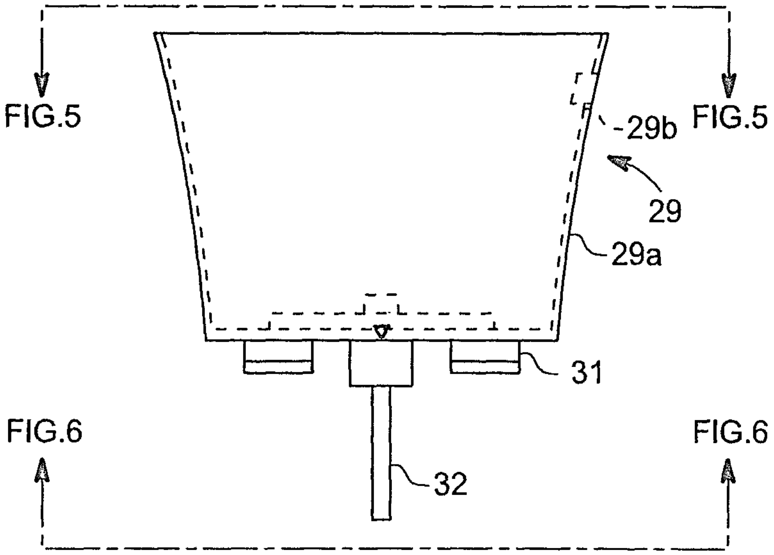
FIG. 2 is a front elevational view of a switch selection portion.
Figure 3:
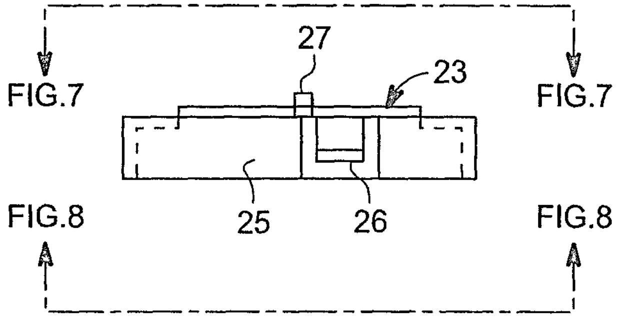
FIG. 3 is an enlarged front elevational view of a switch mounting fixture.

An upstanding rotation limit switch lug 27 is slidably disposed within an aligned corresponding guide slot 28 in the base of a rotatable switch and bulb mount 29, best seen in FIGS. 1, 2 and 3 of the drawings.

The switch and bulb mount 29 has an upstanding conical sidewall 29A with a heat shield insert liner 29B fitted therein. The base of the switch and bulb mount 29 has an annular spaced depending retainment clips 31 with a centered extending switch activation rod 32.

Figure 10:
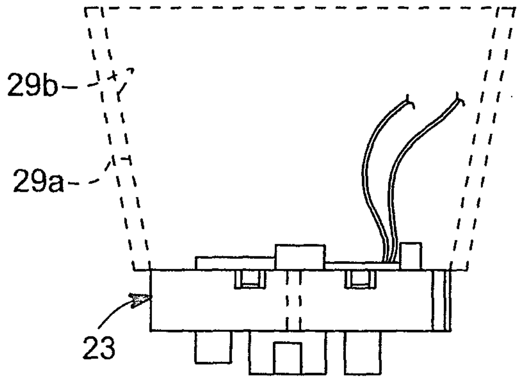
FIG. 10 is an enlarged partial side elevational view of the switch assembly with portions shown in broken lines.
Figure 11:
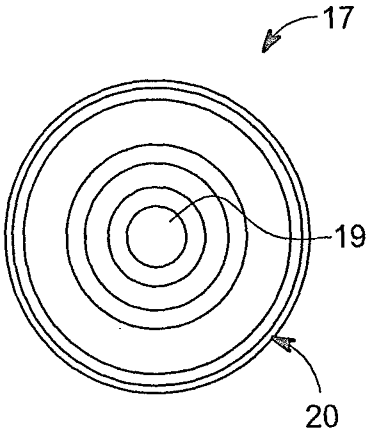
FIG. 11 is an enlarged top plan view on lines 11-11 of FIG. 4.
Figure 12:
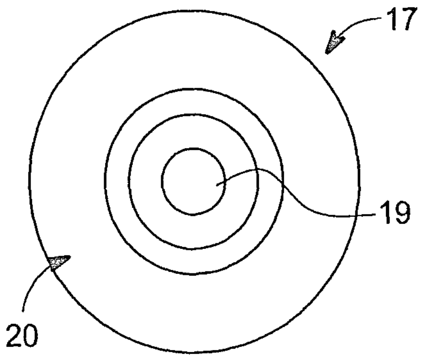
FIG. 12 is an enlarged bottom plan view on lines 12-12 of FIG. 4.
Figure 13:
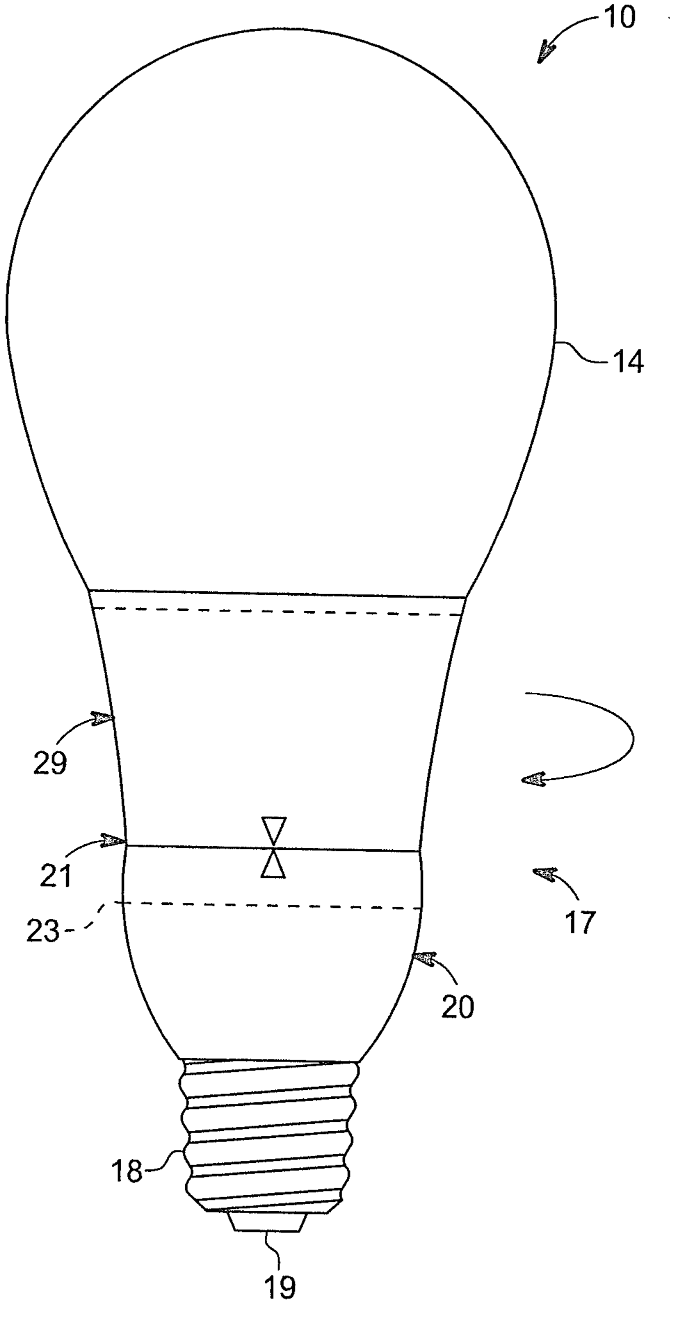
FIG. 13 is a front elevational view of the assembled switchable bulb of the invention.

The retainment clips 31 engage through mounting ring fixture 23 center opening at 24A rotatably securing the mounting ring fixture 23 thereto during assembly as seen in FIG. 10 of the drawings.

A pair of power wires PW extend from the circuit board 22 which has a micro-electronic LED dimmer 33 centrally positioned thereon in alignment with the hereinbefore described activation rod 32 which engages same for selective rotation.

Referring now to FIG. 1 of the drawings, during the assembly of the switchable dimmable lightbulb 10 of the invention, the circuit board 22 with the micro-electronic LED dimmer 33 is secured to the mounting ring 23 which in turn is rotatably retained to the bottom of the rotatable bulb mount 29 by the depending clips 31 as hereinbefore described.

The mounting ring fixture 23 is thereby secured within the base housing 20 via the resilient press to fit clips 26 in the fixture sidewall 25 as hereinbefore described.

The LED driver chip assembly 13 secured within the bulb and switch mount 29's open end at 29A with the light diffusing globe 14 secured thereover. Power wires PW connect the support base assembly 17 to the circuit board 22 and from the circuit board 22 to the LED driver assembly 13.

The switch activation rod 32 will registerably engages the dimmer 32 so that by user manual rotation of the switch and bulb mount 29 varies the power through the dimmer 33 supplied to the LED driver assembly 13 during use.

Referring to FIGS. 14-19 of the drawings, an alternate switchable light bulb 35 of the invention can be seen having an LED bulb portion 36 and a switch portion 37. The LED bulb portion 36 has an LED driver chip RGB assembly 38 positioned within a plastic light diffusing globe 39 as is well known within the art. A globe base 40 is provided as a mounting surface enclosure and support surface for the LED chip assembly The switch portion 37 comprises a switch support housing 38 with a threaded metal base 39 with a positive center power contact 40 in a non-conductive plastic insulator 41 as is well known within the art. A rotary selective assembly switch 42 can be seen having a fixed selectable activation contact 43 with an annular base 44 and in this example having three power activation contacts 45A, 45B and 45C designated as red, green, and blue the "primary colors". This allows the switchable light bulb 10 to generate different color visible light output on demand. The activation contacts 45A, 45B and 45C are in communication with the LED driver chip assembly 38 and are positioned, in this example, on the top surface S in an arcuate spaced pattern thereon with a control return slot 46 in oppositely disposed relation that limits the rotational travel that will be described in greater detail hereinafter.

Figure 14:
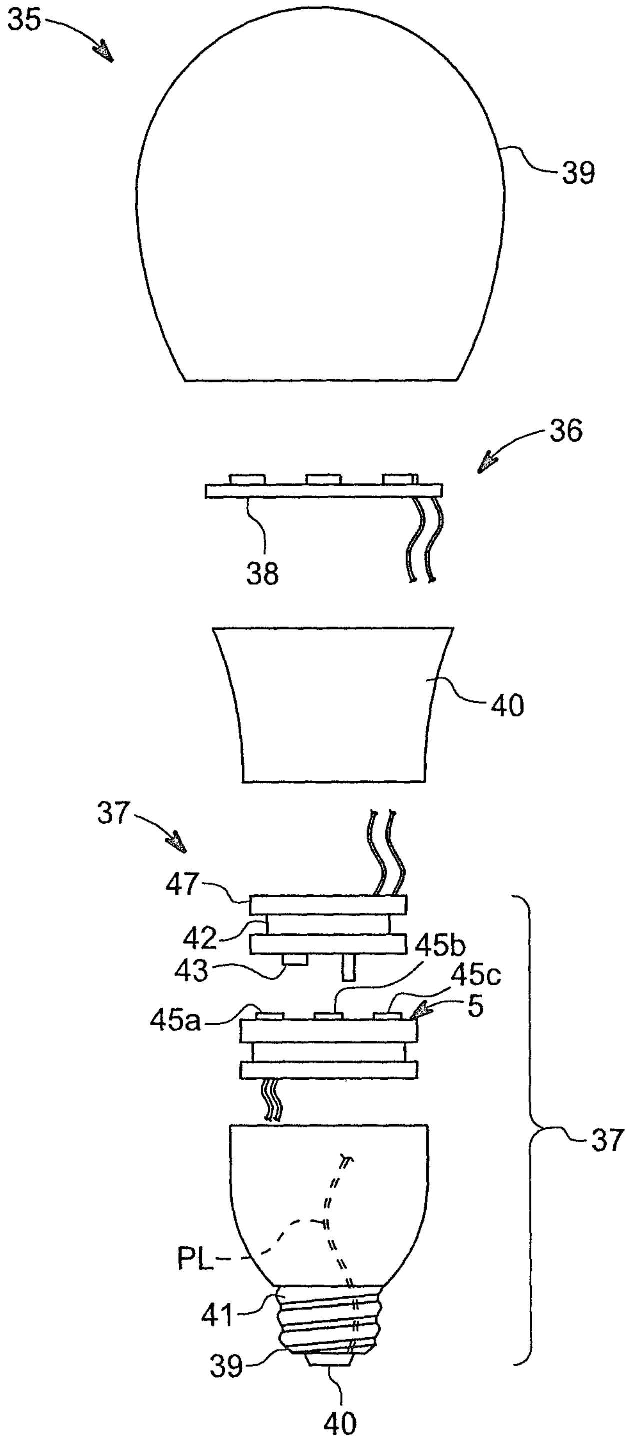
FIG. 14 is an exploded front elevational view of an alternate form of the invention.
Figure 15:
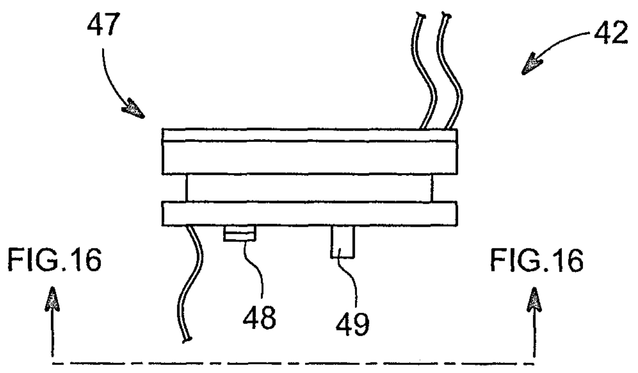
FIG. 15 is an enlarged front elevational view of the alternate selection switch of the invention.
Figure 16:
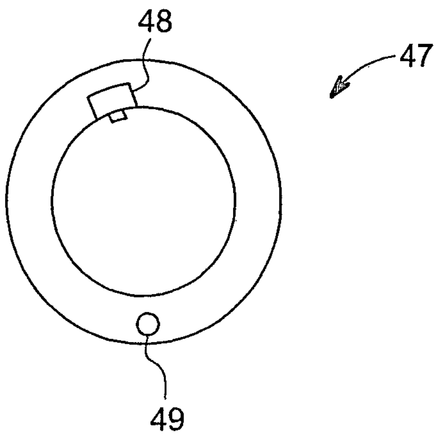
FIG. 16 is a bottom plan view on lines 16-16 of FIG. 15.
Figure 17:
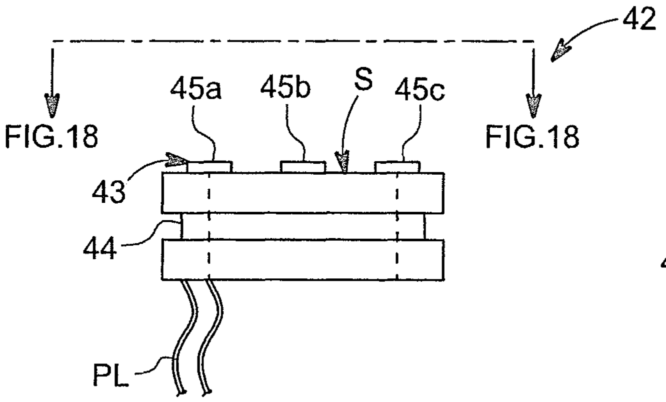
FIG. 17 is an enlarged front elevational view of the alternate selection switch component.
Figure 18:
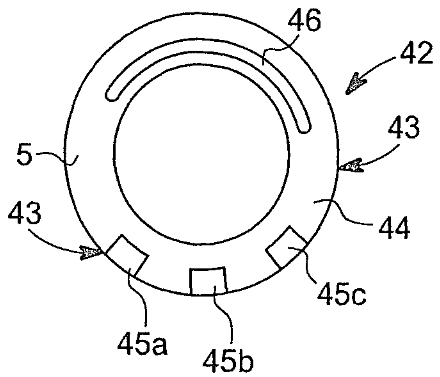
FIG. 18 is an enlarged top plan view thereof on lines 18-18 of FIG. 17.
Figure 19:
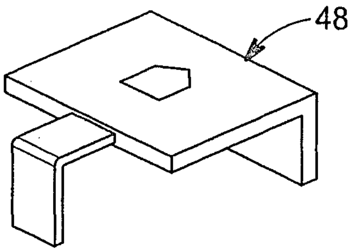
FIG. 19 is an enlarged perspective view of a power contact of the switch assembly.

A switch rotational activation contact assembly 47 can be seen in FIGS. 14, 14 and 16 of the drawings having a power activation contact clip 48 and a rotatable limit post 49 extending therefrom.

The power contact clip 48 is in communication with the "hot" power lead PL from the bulb socket, not shown, and the positive power center contact 40.

The orientation assembly allows the metal base 39 to be rotatably secured in the bulb socket BS and connected to a power source. The rotatable switch assembly 47 can be selectively rotated through a partial 180-degree arcuate travel defined by registration of the limit post 49 in the control return slot 46.

In the switchable lightbulb assembly 35, the rotatable switch 47 is positioned in the globe base 40. The rotatable switch 47 power contact clip 48 can be manually rotated so as to selectively engage separately the respective activation clip contacts 45A, 45B and 45C thereby completing the electrical circuit to power and illuminate the corresponding LED driver chip assembly 38 in kind.

It will be evident from the above description that the selectability of the LED driver chip assembly 38 can be inclusive of the effective quality of the light output as to color and such as warm or cold typically available with LED adapted systems.

It will be evident from the above description that the selectability of the LED driver chip assembly 13 can be inclusive of the effective quality of the light output such as warm or cold typically available with LED adapted systems.

It will be evident from the above description that an integrated LED light source with changeable selectable light output has been illustrated and described that can be adapted to standard bulb socket configurations will be evident to those skilled in the art that various changes and modifications may be made therein. Therefore, I claim:

The invention claimed is:

1. An adjustable LED lightbulb assembly configured to be connected to a lightbulb socket, the lightbulb assembly comprising, a support base including electrically conductive shell thereabout configured to be removably connected to the lightbulb socket, the conductive shell defining a negative terminal of the lightbulb and a center positive terminal, a variable LED intensity switch assembly comprising, a circuit mounting ring secured to said support base, an LED control circuit within said circuit mounting ring in communication with a source of power from said bulb socket, a switch bulb mount retained to said circuit mounting ring by annular spaced clips extending therefrom, an LED chip assembly secured in said switch bulb mount, and a diffuser globe secured to said switch bulb mount, a switch activation element extending from said switch bulb mount for rotatable registration with an electrical dimmer registered within said LED control circuit for selection of varied electrical output to said LED chip assemblies.

2. The adjustable LED lightbulb assembly set forth in claim 1 wherein said circuit mounting ring has a rotational limiter lug registerable within an arcuate guide slot in said switch bulb mount.

3. The adjustable LED lightbulb assembly set forth in claim 1 further comprising, a rotary selective switch having a power contact clip registerably aligned for selective rotational engagement with activation contacts.

4. The adjustable LED lightbulb assembly set forth in claim 3 wherein said rotational selection switch has a limit post registerable in a center return slot in an annular base.

* * * * *